United States Patent
Hashimoto et al.

(10) Patent No.: US 10,414,050 B2
(45) Date of Patent: Sep. 17, 2019

(54) AUTOMATED ASSEMBLY METHOD USING AUTOMATED ASSEMBLY APPARATUS

(71) Applicant: CANON KABUSHIKI KAISHA, Tokyo (JP)

(72) Inventors: Yuki Hashimoto, Tokyo (JP); Kensuke Uehara, Atsugi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/155,635

(22) Filed: Oct. 9, 2018

(65) Prior Publication Data

US 2019/0039245 A1 Feb. 7, 2019

Related U.S. Application Data

(63) Continuation of application No. 15/079,816, filed on Mar. 24, 2016, now Pat. No. 10,131,055.

(30) Foreign Application Priority Data

Mar. 31, 2015 (JP) .................................. 2015-070770

(51) Int. Cl.
*B25J 9/16* (2006.01)
*B23P 19/04* (2006.01)
(Continued)

(52) U.S. Cl.
CPC ............. *B25J 9/1687* (2013.01); *B23P 19/04* (2013.01); *B23P 19/105* (2013.01); *B23P 21/00* (2013.01);
(Continued)

(58) Field of Classification Search
CPC ....... B25J 9/04; B25J 9/08; B25J 9/123; B25J 9/1005; B25J 9/144; B25J 9/1687;
(Continued)

(56) References Cited

U.S. PATENT DOCUMENTS 4,872,257 A 10/1989 Wakamori
5,271,139 A 12/1993 Sticht
(Continued)

FOREIGN PATENT DOCUMENTS

JP 1-99537 7/1989
JP 1-212676 8/1989
(Continued)

OTHER PUBLICATIONS

Chinese Office Action dated Jul. 4, 2018 during prosecution of related Chinese application No. 201610180531.2. (Previously cited during prosecution of parent U.S. Appl. No. 15/079,816).
(Continued)

*Primary Examiner* — Jermie E Cozart
(74) *Attorney, Agent, or Firm* — Venable LLP (57) ABSTRACT

An automated assembly apparatus includes an assembly robot, which has a plurality of hands of different heights and an XY-axis moving unit movable in a horizontal direction, and a plurality of operation base units which have operation bases and Z-axis moving unit capable of moving the operation bases in a vertical direction. The automated assembly apparatus further includes a control unit which raises in advance, before the assembly robot reaches above the operation bases, the operation bases by the Z-axis moving unit to positions where the operation bases do not interfere with the plurality of hands.

13 Claims, 5 Drawing Sheets

(51) Int. Cl.
| | |
|---|---|
| *B23P 19/10* | (2006.01) |
| *B23P 21/00* | (2006.01) |
| *B25J 11/00* | (2006.01) |
| *G05B 19/418* | (2006.01) |
| *B25J 9/04* | (2006.01) |
| *B25J 13/08* | (2006.01) |
| *B25J 9/12* | (2006.01) |

(52) U.S. Cl.
CPC ............ *B25J 11/005* (2013.01); *B25J 11/008* (2013.01); *G05B 19/41815* (2013.01); *B23P 21/004* (2013.01); *B23P 21/008* (2013.01); *B25J 9/04* (2013.01); *B25J 9/123* (2013.01); *B25J 9/1612* (2013.01); *B25J 9/1617* (2013.01); *B25J 9/1676* (2013.01); *B25J 13/086* (2013.01); *B25J 13/089* (2013.01); *G05B 2219/31078* (2013.01); *G05B 2219/31079* (2013.01); *G05B 2219/31081* (2013.01); *Y02P 90/08* (2015.11); *Y02P 90/083* (2015.11); *Y10T 29/49902* (2015.01)

(58) Field of Classification Search
CPC ...... B25J 11/005; B25J 11/008; B25J 13/086; B25J 13/089; B25J 9/1617; B25J 9/1615; B25J 9/1612; B25J 9/10; B25J 9/026; B25J 9/0096; B25J 9/0087; B25J 9/0084; B25J 15/00; B25J 9/1676; B25J 9/1664; B25J 9/1656; G05B 19/41815; G05B 2219/31079; G05B 2219/31081; B23P 19/105; B23P 21/008; B23P 21/004; B23P 21/00

See application file for complete search history.

(56) References Cited

U.S. PATENT DOCUMENTS

| | | | |
|---|---|---|---|
| 5,539,975 | A | 7/1996 | Kukuljan |
| 6,519,837 | B1 | 2/2003 | Ichikawa |
| 6,591,488 | B1 | 7/2003 | Tachibana |
| 6,664,731 | B2 | 12/2003 | Hashimoto |
| 2002/0064447 | A1 | 5/2002 | Gurevich |

FOREIGN PATENT DOCUMENTS

| | | |
|---|---|---|
| JP | 5-235598 | 9/1993 |
| JP | 7-108475 | 4/1995 |
| JP | 7-276152 | 10/1995 |
| JP | 8-71975 | 3/1996 |
| JP | 9-275299 | 10/1997 |
| JP | 2001-300827 | 10/2001 |
| JP | 2002-126954 | 5/2002 |
| WO | 97/20455 | 6/1997 |
| WO | 2005/002804 | 1/2005 |
| WO | 2009/096239 | 8/2009 |

OTHER PUBLICATIONS

Japanese Office Action dated Nov. 22, 2018 during prosecution of related Japanese application No. 2015-070770. (English-language machine translation included).

AUTOMATED ASSEMBLY METHOD USING AUTOMATED ASSEMBLY APPARATUS

This application is a continuation of U.S. application Ser. No. 15/079,816, filed Mar. 24, 2016, which claims priority to Japan 2015-070770, filed on Mar. 31, 2015, the contents of each of which is hereby incorporated by reference.

BACKGROUND OF THE INVENTION

Field of the Invention

The present invention relates to an automated assembly apparatus and an automated assembly method, which use an assembly robot.

Description of the Related Art

Hitherto, in an automated assembly apparatus which uses a robot, a Z-axis of the robot gripping an assembly component moves up and down to assemble the assembly component to a component to be assembled.

Automated assembly apparatuses have been required to achieve reduced assembling operation time. Japanese Patent Application Laid-Open No. H5-235598 describes a component mounting apparatus which suctions a component by a suction nozzle and moves horizontally with respect to a substrate to mount the component at a predetermined position on the substrate.

The component mounting apparatus described in Japanese Patent Application Laid-Open No. H5-235598 is capable of reducing the component mounting time to a certain extent. However, the Z-axis has to be raised to a height which clears the maximum height of an interfering object on the movement path when XY-axes move. In addition, when mounting a component, the Z-axis has to be lowered by the same height it has been lifted to clear the interfering object. This has been posing a problem in that the time for mounting a component increases as the height of an interfering object on the movement path increases.

SUMMARY OF THE INVENTION

An object of the present invention is to solve the problem which cannot be solved by the foregoing conventional techniques, and therefore to provide an automated assembly apparatus and an automated assembly method which reduce assembly operation time.

To this end, an automated assembly apparatus in accordance with the present invention has an automated assembly apparatus which has an assembly robot having a plurality of hands of different heights and XY-axis moving unit movable in a horizontal direction, and a plurality of operation base units having operation bases and Z-axis moving unit capable of moving the operation bases in a vertical direction, the automated assembly apparatus including:
  a control unit which raises the operation bases in advance by the Z-axis moving unit to positions, at which the operation bases do not interfere with the plurality of hands, before the assembly robot reaches above the operation bases.

Further, to this end, an automated assembly method in accordance with the present invention is adapted to assemble an assembly component to a component to be assembled by using an assembly robot which has a plurality of hands of different heights and XY-axis moving unit movable in a horizontal direction, and a plurality of operation base units having operation bases and Z-axis moving unit capable of moving the operation bases in a vertical direction, the automated assembly method including:
  a first operation step of raising a first hand, which is one of the plurality of hands, and a first operation base, which is one of the plurality of operation bases, so as to perform a job on a component to be assembled and/or an assembly component; and
  a second operation step of raising a second hand among the plurality of hands and a second operation base, which is an operation base other than the first operation base, so as to perform a job on a component to be assembled and/or an assembly component after the first operation step,
  wherein the second operation base is raised, during a period between a start of the first operation step and a start of the second operation step, to a height at which the plurality of hands and the second operation base do not interfere with each other.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the present description, the phrase "the lowermost portion of a hand" means not only the lowermost portion of a hand itself in the vertical direction but also the lowermost portion of a component projecting from a hand while the hand is gripping the component. Similarly, the phrase "the uppermost portion of an operation base" means not only the uppermost portion of the operation base itself in the vertical direction but also the uppermost portion of a component on an operation base while the component is being placed on the operation base. Obviously, an operation base or a hand will imply the phrase "the uppermost portion" or "the lowermost portion" even if the phrases are not explicitly used.

An embodiment of the automated assembly apparatus in accordance with the present invention will be described with reference to the accompanying drawings. In the drawings, like components will be assigned like reference numerals.

Figure 1:
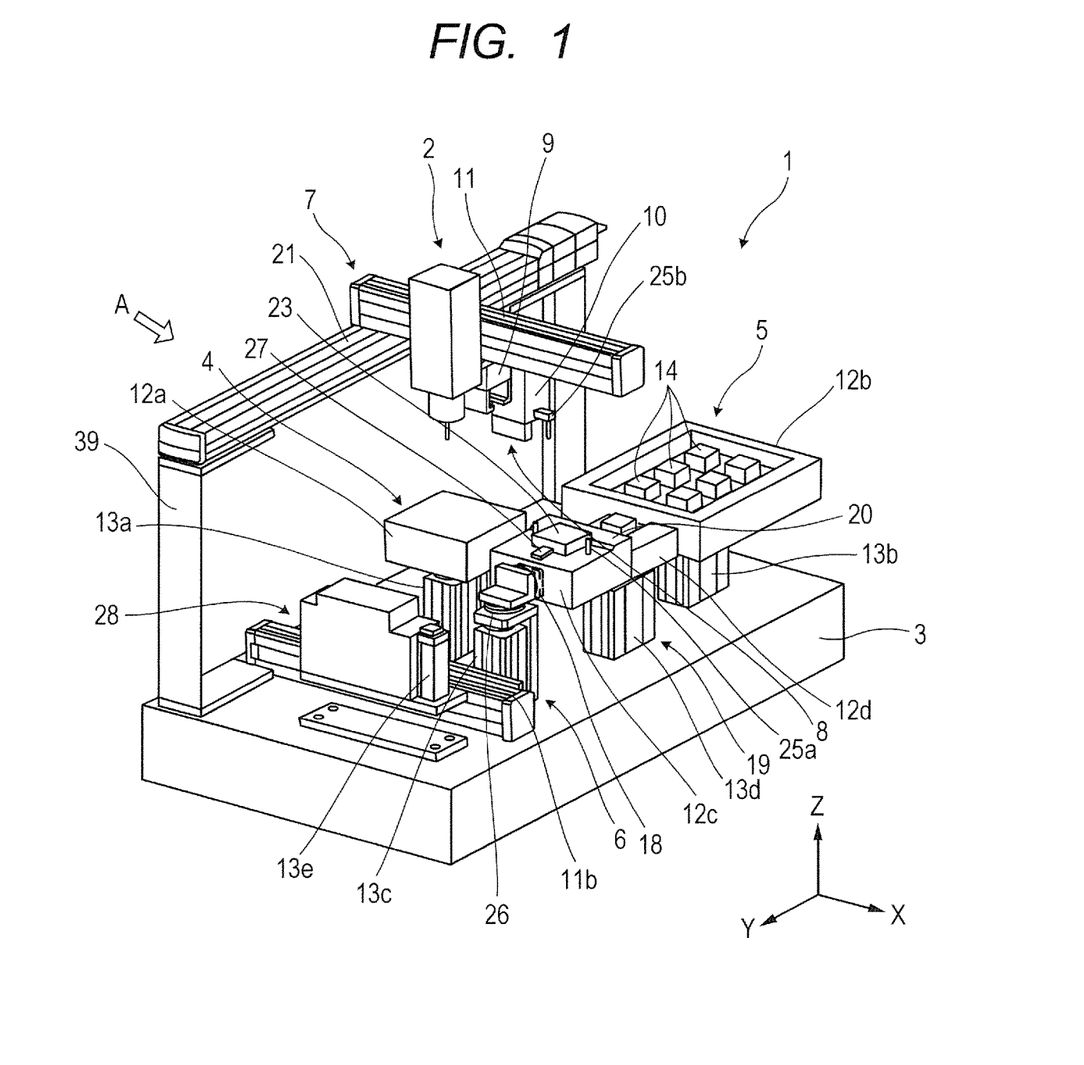
FIG. 1 is a schematic perspective view of an automated assembly apparatus in accordance with the present invention.

FIG. 1 is a schematic perspective view of an automated assembly apparatus in accordance with the present invention. An automated assembly apparatus 1 is comprised of an assembly robot 2, a first operation base unit 4, a second operation base unit 5, a third operation base unit 6, a positioning unit 19 and a screw supply unit 28, each of which is placed on a base 3 and movable in a horizontal plane.

The second operation base unit (supply unit) 5 has an operation base 12b, which is a supply pallet suppliably accommodating at least one or more assembly components 14. The assembly components 14 are gripped and picked up from the operation base 12b by an assembly hand 10, which will be discussed hereinafter.

The assembly robot 2 is attached to an X-axis moving unit 11 movably mounted on a guide rail of a Y-axis moving unit 21 provided on a supporting post 39 fixed to the base 3. Further, the assembly hand 10 and a transfer (moving) hand 9 are mounted on the guide rail of the Y-axis moving unit 21 such that the assembly hand 10 and the transfer hand 9 are movable in an X-axis direction. The assembly hand 10 has a through hole 25b serving as a guiding means, which allows the assembly hand 10 to be positioned with respect to an operation base 12c, which will be discussed hereinafter. An X-axis and a Y-axis are orthogonal to each other, and the X-axis and the Y-axis lie in the same plane. The assembly robot 2 does not have a driving unit in a Z-axis direction.

The first operation base unit 4 is a unit for loading a component 23 to be assembled onto the automated assembly apparatus 1. As with a third operation base unit 6, which will be discussed hereinafter, the first operation base unit 4 is capable of positioning and holding the component 23 to be assembled and is composed of a Z-axis moving unit 13a, a detecting unit 50a and an operation base 12a. Each of the first operation base unit 4 and the second operation base unit 5, which are holding means, can be moved in a vertical direction by the Z-axis moving unit 13a and a Z-axis moving unit 13b, which move the operation base units in the Z-axis direction.

An operator or a robot (not illustrated) places the component 23 to be assembled on the operation base 12a, and the component 23 to be assembled is positioned and held by operating a control panel or the like (not illustrated). Alternatively, however, the component 23 to be assembled may be carried to the first operation base unit 4 by a carrying means (not illustrated).

The third operation base unit 6 is a unit adapted to position and hold the component 23 to be assembled in order to assemble the assembly component 14 to the component 23 to be assembled. The third operation base unit 6 is composed of an X-axis moving unit 11b, a Z-axis moving unit 13c, a detecting unit 50c, the operation base 12c, and a work holding means 27 for positioning and holding the component 23 to be assembled. The third operation base unit 6 further includes a guiding means 25a and a compliance mechanism (profiling means) 26, which is allowed to freely move in the X-axis direction, the Y-axis direction and a rotational direction.

The compliance mechanism 26 has a locking and unlocking mechanism, which unlocks to enable the operation base 12c to move when positioning the operation base 12c and the assembly hand 10. The locking and unlocking mechanism remains locked except for the positioning, thereby allowing the operation base 12c to be locked. Further, the third operation base unit 6 may be provided with a first rotating means 18, which makes the operation base 12c rotatable as necessary.

The positioning unit 19 provided with an operation base 12d is adapted to position the assembly component 14 in advance so as to perform highly accurate assembly. The positioning unit 19 is placed on a Z-axis moving unit 13d. Disposed on the positioning unit 19 is a positioning means 20, which engages the assembly component 14 to set the phase of the rotational direction and the position in the XY-axis direction of the assembly component 14 with high accuracy.

The second operation base unit 5 is adapted to store and supply the assembly components 14, the operation base 12b being placed on the Z-axis moving unit 13b. The second operation base unit 5 may accommodate a plurality of types of assembly components. Further alternatively, a plurality of types of pallets may be arranged to supply a plurality of types of assembly components.

The screw supply unit 28 is adapted to store and supply screws and is provided with a Z-axis moving unit 13e.

Figure 2:
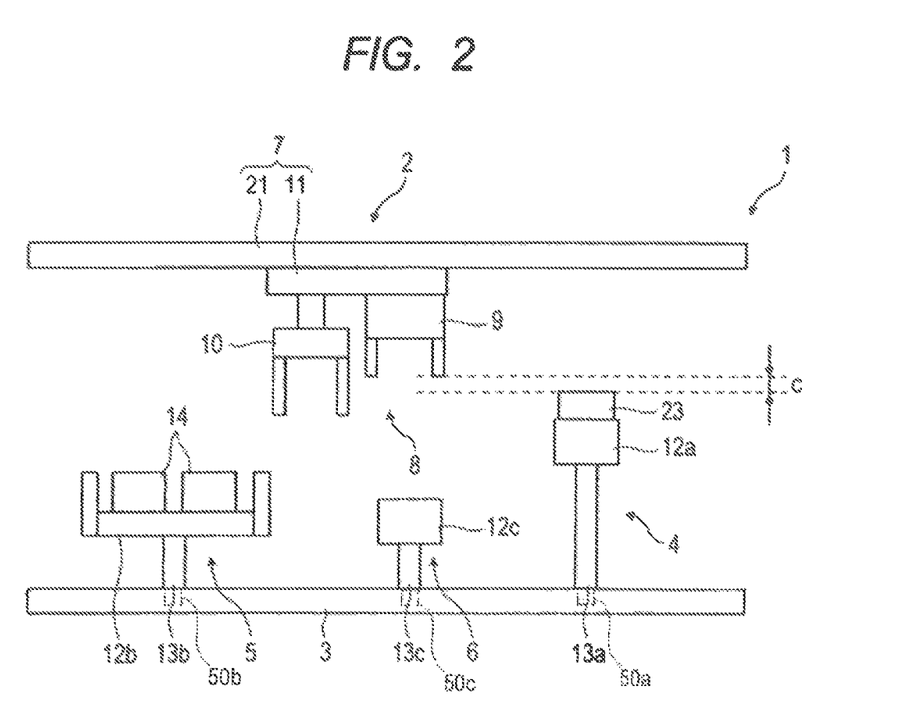
FIG. 2 is a schematic diagram of an automated assembly apparatus according to an embodiment of the present invention.

FIG. 2 is a schematic diagram illustrating the automated assembly apparatus according to the embodiment of the present invention. FIG. 2 is a schematic diagram for explaining the operation of the automated assembly apparatus, the diagram illustrating the automated assembly apparatus observed from the direction of an arrow A in FIG. 1. In FIG. 2, for the sake of explanation convenience, a component of the configuration illustrated in FIG. 1 is omitted. Further, in order to make the explanation of the positional relationship in the vertical direction easier to understand, the plane arrangement of some of the operation base units illustrated in the diagram has been changed from the actual plane arrangement.

The automated assembly apparatus 1 has the assembly robot 2 movable on a horizontal plane, and the plurality of operation base units, namely, the first operation base unit 4, the second operation base unit 5, and the third operation base unit 6, each of which is disposed on the base 3 and has the Z-axis moving unit movable in the vertical direction.

The assembly robot 2 has an XY-axis moving unit 7 provided with the X-axis moving unit 11 and the Y-axis moving unit 21. The XY-axis moving unit 7 has a plurality of hands 8 having different heights to perform an assembly operation. The plurality of hands 8 having different heights are comprised of the transfer hand 9 and the assembly hand 10.

The first operation base unit 4 is adapted to load the components 23 to be assembled onto the automated assembly apparatus 1, and includes the operation base 12a and the Z-axis moving unit 13a. To supply the component 23 to be assembled to the first operation base unit 4, the component 23 to be assembled is loaded onto the operation base 12a by a loading means (not illustrated). The component 23 to be assembled may alternatively be loaded by an operator placing the component 23 to be assembled on the operation base 12a.

The second operation base unit 5 includes the operation base 12b, which suppliably accommodates at least one or more assembly components 14, and the Z-axis moving unit 13b.

The third operation base unit 6 includes the operation base 12c for assembling the assembly components 14 to the components 23 to be assembled, and the Z-axis moving unit 13c.

Figure 3:
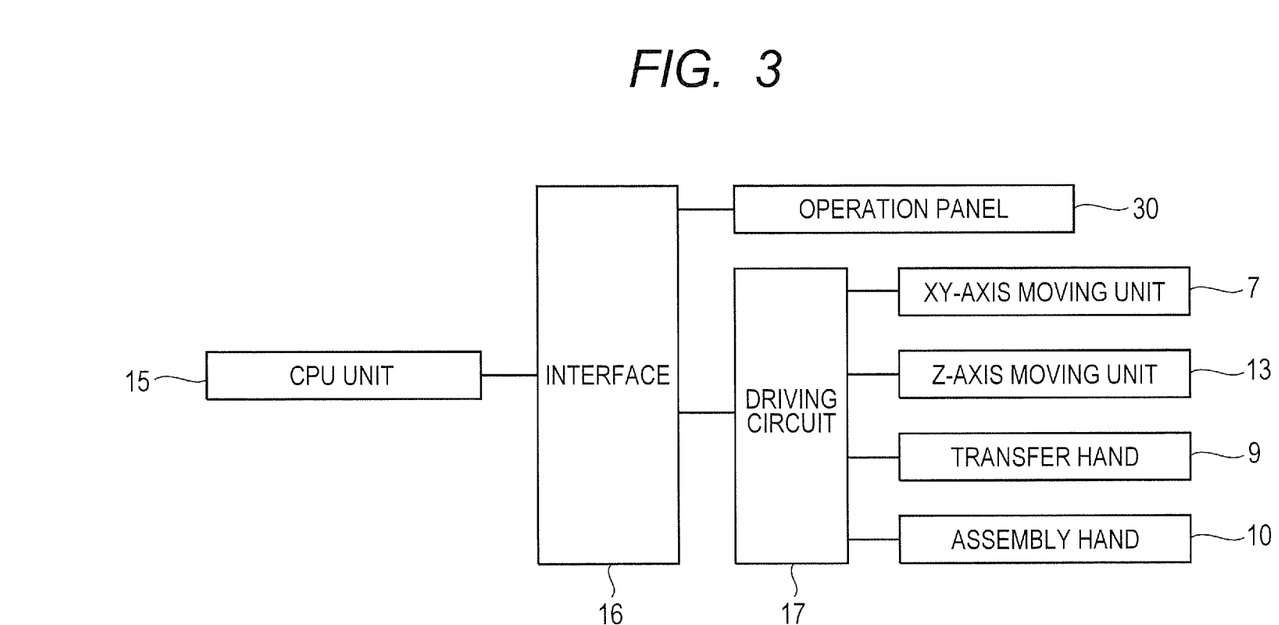
FIG. 3 is a block diagram illustrating the configuration of a control system of the automated assembly apparatus according to the embodiment of the present invention.

FIG. 3 is a control block diagram of the control unit, which controls the automated assembly apparatus 1. A CPU unit 15 controls the operation of the automated assembly apparatus 1 according to a program stored therein. The CPU unit 15 controls the drive of the XY-axis moving unit 7, the Z-axis moving unit 13a, 13b, 13c, 13d and 13e, the transfer hand 9, and the assembly hand 10 through the intermediary of an interface 16 and a driving circuit 17. A control panel 30 is operated to start up the program stored in the CPU unit 15 through the interface 16 so as to operate the automated assembly apparatus 1.

Figure 4A:
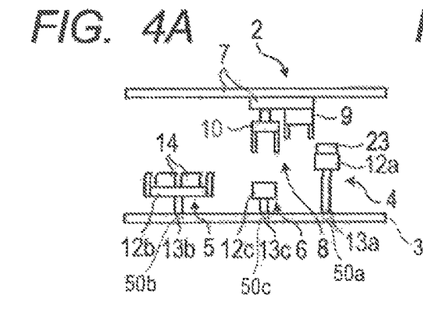
FIGS. 4A, 4B, 4C, 4D, 4E, 4F, 4G and 4H are explanatory diagrams illustrating the operation of an assembly robot in the automated assembly apparatus according to the embodiment of the present invention.

Referring now to FIG. 4A to FIG. 4H, the series of operations of the automated assembly apparatus 1 according to the embodiment of the present invention will be specifically described. First, the component 23 to be assembled is placed on the operation base 12a of the first operation base unit 4 by the operator or a carrying means (not illustrated). This state is illustrated in FIG. 4A.

After setting the component 23 to be assembled, the control panel 30 is operated to start up the program stored in the CPU unit 15. Upon the startup of the program, the XY-axis moving unit 7 and the Z-axis moving unit 13a are driven by the CPU unit 15 through the driving circuit 17.

When the XY-axis moving unit 7 is driven, the assembly robot 2 starts to horizontally move to the component-to-be-assembled takeout position above the first operation base unit 4. The Z-axis moving unit 13a causes the first operation base unit 4 to start ascending to the pre-delivery position of the component 23 to be assembled, at which the clearance between the transfer hand 9 and the uppermost portion of the component 23 to be assembled, which has been placed on the operation base 12a, reaches a predetermined clearance "c."

Figure 4B:
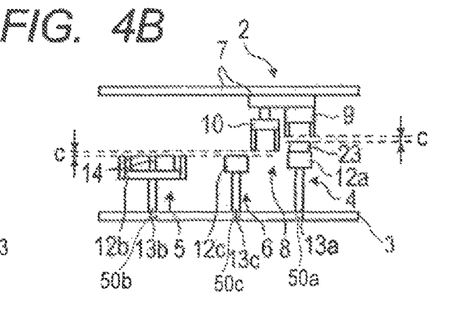

The second operation base unit 5 is started to ascend, by Z-axis moving unit 13b, to the pre-delivery position of the assembly component 14, at which the clearance between the assembly hand 10 and the uppermost portion of the operation base 12b reaches the predetermined clearance "c." Further, the third operation base unit 6 is started to ascend, by the Z-axis moving unit 13c, to the pre-receiving position of the component 23 to be assembled, at which the clearance between the assembly hand 10 and the uppermost portion of the operation base 12c reaches the predetermined clearance "c." The state in which these operations have been completed is illustrated in FIG. 4B.

Figure 4C:
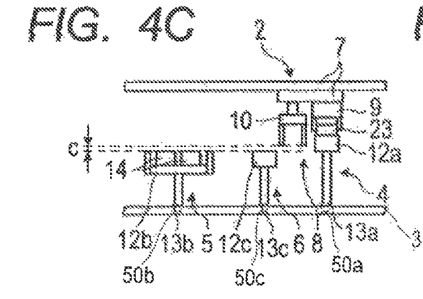
Figure 4D:
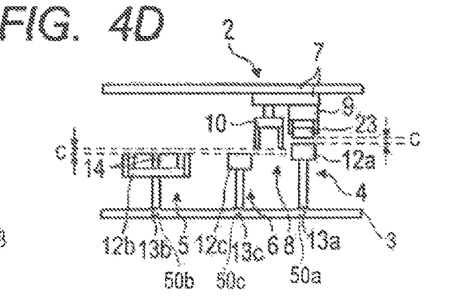
Figure 4E:
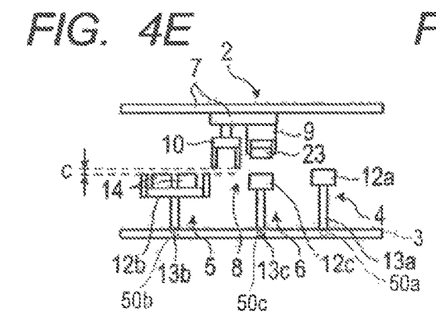
Figure 4F:
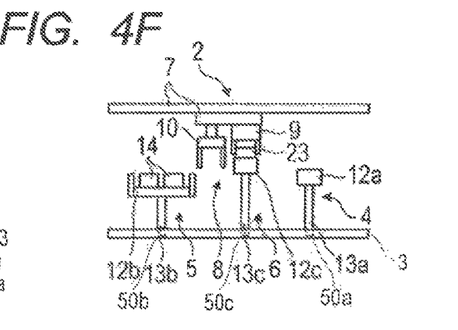
Figure 4G:
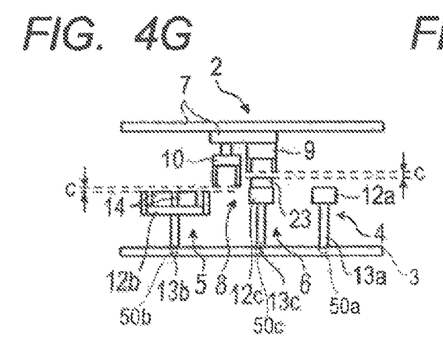
Figure 4H:
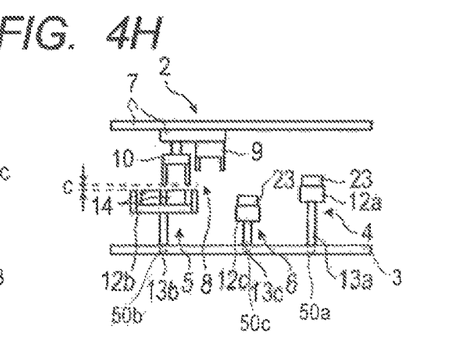
Figure 5:
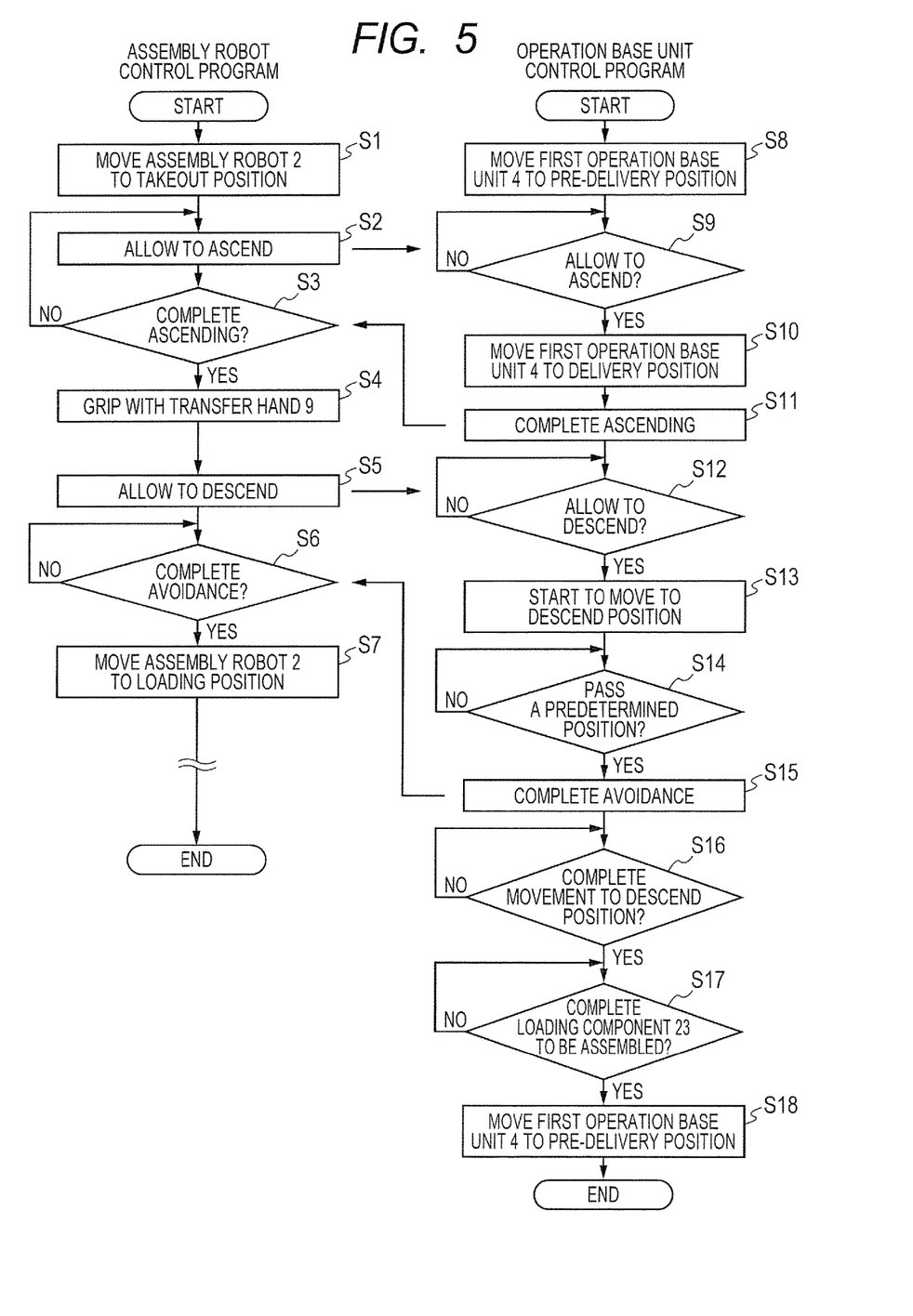
FIG. 5 is a flowchart of the operation of the automated assembly apparatus according to the embodiment of the present invention.

Referring now to FIG. 4A to FIG. 4H and the flowchart of FIG. 5, the following will describe the operation performed by the assembly robot 2 to take out the component 23 to be assembled from the first operation base unit 4.

In step S1, the XY-axis moving unit 7 of the assembly robot 2 starts to move the assembly robot 2 to the takeout position above the first operation base unit 4. Meanwhile, before the assembly robot 2 completes its movement to the takeout position above the first operation base, the first operation base unit 4 moves in the Z-axis direction to the pre-delivery position (FIG. 4B) in step S8 such that the clearance "c" is present. Additionally, the third operation base unit 6 may be moved in the Z-axis direction to it preassembly position such that the clearance "c" shown in FIG. 4B is present. Of course, the third operation base 6 need not be moved at this time, and in one embodiment, the operation base 6 may be moved in the Z-axis direction to its pre-assembly position upon completion of the robot assembly 2 gripping the component 23 from the first operation base 4. Once the robot assembly 2 has been positioned above the first operation base 4 to the takeout position, the assembly robot control program issues an allow to ascend signal in S2, and the operation base control program receives the ascent permission signal from the assembly robot 2 in step S9. Thereafter, in step S10, the first operation base unit 4 moves to be assembled delivery position at which the component 23 to be assembled can be delivered to the assembly robot 2.

Subsequently, in step S11, the first operation base unit 4 issues an ascent completion signal to the assembly robot 2.

Upon receipt of the ascent completion signal from the first operation base unit 4 (step S3), the transfer hand 9 grips (holds) the component 23 to be assembled (step S4), placing the assembly robot 2 in the state illustrated in FIG. 4C. Then, in step S5, the assembly robot 2 issues a descent permission signal to the first operation base unit 4. Upon receipt of the descent permission signal from the assembly robot 2 in step S12, the first operation base unit 4 starts to move to a descent position in step S13.

Subsequently, as illustrated in FIG. 4D, a detecting unit 50a detects that the first operation base unit 4 has passed the predetermined position, at which the clearance between the operation base 12a of the first operation base unit 4 and the lowermost portion of the component 23 to be assembled, which is being gripped by the transfer hand 9, reaches the clearance "c" (step S14). After the detection, the first operation base unit 4 issues an avoidance completion signal to the assembly robot 2 in step S15. The assembly robot 2 receives the avoidance completion signal from the first operation base unit 4 in step S6, and starts to move the assembly robot 2 to the loading position above the third operation base unit 6 (step S7).

As illustrated in FIG. 4E, after the assembly robot 2 completes its movement to the component 23 to be assembled loading position above the third operation base unit 6, the assembly robot 2 issues the ascent permission signal to the third operation base unit 6. Upon receipt of the ascent permission signal from the assembly robot 2, the third operation base unit 6 moves to the receiving position of the component 23 to be assembled, at which the component 23 to be assembled can be received from the assembly robot 2.

Then, the third operation base unit 6 issues the ascent completion signal to the assembly robot 2. Upon receipt of the ascent completion signal from the third operation base unit 6, the transfer hand 9 releases the component 23 to be assembled to deliver the component 23 to be assembled to the operation base 12c, placing the assembly robot 2 in the state illustrated in FIG. 4F.

Subsequently, the assembly robot 2 issues the descent permission signal to the third operation base unit 6. Upon receipt of the descent permission signal from the assembly robot 2, the third operation base unit 6 starts to move to the descent position. As illustrated in FIG. 4G, the detecting unit 50c detects that the third operation base unit 6 has passed the predetermined position, at which the clearance between the uppermost portion of the component 23 to be assembled set on the operation base 12c and the lowermost portion of the transfer hand 9 reaches the clearance "c." After the detection, the third operation base unit 6 issues the avoidance completion signal to the assembly robot 2. Upon receipt of the avoidance completion signal from the third operation base unit 6, the assembly robot 2 starts to move to the takeout position of the assembly component 14 above the second operation base unit 5. Again, similar to the above description with regard to the third operation base 6, the second operation base 5 may be moved in the Z-axis direction to its pre-assembly position at the same time as the other bases are moved, or prior to the robot assembly moving from the operation base 6 to the operation base 4.

As illustrated in FIG. 4H, after the assembly robot 2 completes its movement to the takeout position of the assembly component 14 above the second operation base unit 5, the assembly robot 2 issues the ascent permission signal to the second operation base unit 5. Upon receipt of the ascent permission signal from the assembly robot 2, the second operation base unit 5 moves the assembly component 14 to the delivery position of the assembly component 14 at which the assembly component 14 can be delivered to the assembly robot 2. Next, the second operation base unit 5 issues the ascent completion signal to the assembly robot 2. The assembly robot 2 receives the ascent completion signal from the second operation base unit 5, and the assembly hand 10 grips the assembly component 14.

Subsequently, the assembly robot 2 issues the descent permission signal to the second operation base unit 5. Upon receipt of the descent permission signal from the assembly robot 2, the second operation base unit 5 starts to move to the descent position. Next, the detecting unit 50b detects that the second operation base unit 5 has passed the predetermined position, at which the clearance between the operation base 12b of the second operation base unit 5 and the lowermost portion of the assembly component 14 gripped by the assembly hand 10 reaches the predetermined clearance "c." After the detection, the second operation base unit 5 issues the avoidance completion signal to the assembly robot 2. Upon receipt of the avoidance completion signal from the second operation base unit 5, the assembly robot 2 starts to move to the assembly position of the assembly component 14 above the third operation base unit 6.

The following will describe the operations performed from the state illustrated in FIG. 4H until the assembly component 14 is assembled to the component 23 to be assembled. These operations are similar to those described above, so that the drawings will be omitted.

After completing the movement to the descent position, the third operation base unit 6 ascends to the pre-assembly position of the assembly component 14, at which the clearance between the operation base 12c and the lowermost portion of the assembly component 14 gripped by the assembly hand 10 reaches the predetermined clearance "c." This operation is performed between the start of the movement of the assembly robot 2 to the takeout position of the assembly component 14 and the completion of the movement thereof to the assembly position of the assembly component 14.

After the assembly robot 2 completes its movement to the assembly position of the assembly component 14 above the third operation base unit 6, the assembly robot 2 issues the ascent permission signal to the third operation base unit 6. Upon receipt of the ascent permission signal from the assembly robot 2, the third operation base unit 6 moves the assembly component 14 to the assembly component assembly position where the assembly component 14 can be assembled to the component 23 to be assembled. Then, the third operation base unit 6 issues the ascent completion signal to the assembly robot 2. The assembly robot 2 receives the ascent completion signal from the third operation base unit 6, and the assembly hand 10 releases the assembly component 14 to assemble the assembly component 14 to the component 23 to be assembled. Next, the assembly robot 2 issues the descent permission signal to the third operation base unit 6. Upon receipt of the descent permission signal from the assembly robot 2, the third operation base unit 6 starts to move to the descent position. Then, the detecting unit 50c detects that the third operation base unit 6 has passed the predetermined position, at which the clearance between the assembly component 14 assembled to the component 23 to be assembled set on the operation base 12c and the assembly hand 10 reaches the predetermined clearance "c." After the detection, the third operation base unit 6 issues the avoidance completion signal to the assembly robot 2. Upon receipt of the avoidance completion signal from the third operation base unit 6, the assembly robot 2 starts to move to the takeout position of the component 23 to be assembled above the first operation base unit 4.

In step S16, after the first operation base unit 4 completes its movement to the descent position, the component 23 to be assembled is placed on the operation base 12a by a carrying means, which is not illustrated (step S17). Thereafter, the first operation base unit 4 moves (ascends) to the pre-delivery position of the component 23 to be assembled, at which the clearance between the component 23 to be assembled and the transfer hand 9 reaches the predetermined clearance "c" (step S18). These operations are performed between the start of the movement of the assembly robot 2 to the loading position of the component 23 to be assembled and the movement back to the takeout position of the component 23 to be assembled. It is needless to say that, among the steps, if the result of any one of the steps S3, S6, S9, S12, S14, S16 and S17 is NO, then the processing repeats the same step or goes back to a preceding step, as illustrated in the flowchart.

After the third operation base unit 6 completes its movement to the descent position, the component 23 to be assembled to which the assembly component 14 has been assembled is taken out by the carrying means (not illustrated). After the component 23 to be assembled is taken out, the third operation base unit 6 ascends to the pre-receiving position of the component 23 to be assembled, at which the clearance between the lowermost portion of the assembly hand 10 and the uppermost portion of the operation base 12c reaches the predetermined clearance "c." These operations are started at the instant the assembly robot 2 starts to move to the takeout position of the component 23 to be assembled above the first operation base unit 4 holding the component 23 to be assembled. The operations are performed before the assembly robot 2 holding the component 23 to be assembled moves back to the loading position of the component 23 to be assembled above the third operation base unit 6 in the state wherein the component 23 to be assembled is being held.

After completing the movement to the descent position, the second operation base unit 5 ascends to the pre-delivery position of the assembly component 14, at which the clearance between the assembly hand 10 and the operation base 12b reaches the predetermined clearance "c." This operation is performed between the instant the assembly robot 2 starts to move to the assembly position of the assembly component 14 above the third operation base unit 6 in the state wherein the assembly component 14 is being held and the instant the assembly robot 2 moves back to the takeout position of the assembly component 14 above the second operation base unit 5.

In the foregoing embodiment, the operation bases 12a, 12b and 12c are raised in advance such that the clearance between the operation bases 12a, 12b and 12c and the hands 8 (the transfer hand 9 and the assembly hand 10) will be the clearance "c." Hence, destination data is retained in the Z-axis moving unit 13a, 13b and 13c, and the operation is performed on the basis of the retained destination data.

The foregoing operations are performed by retaining position information in the CPU unit 15 and by monitoring the current positions of the Z-axis moving unit 13a, 13b and 13c, the current positions being checked by the values on encoders, which are the detecting units 50a, 50b and 50c. Alternatively, the ascent positions of the operation bases may be determined by comparing the position information in the CPU unit 15 and the current positions of the Z-axis moving unit 13a, 13b and 13c. Further alternatively, the positions of the operation bases 12a, 12b and 12c may be detected by sensors or image processing so as to determine the ascent positions.

Further, in the foregoing embodiment, the detecting units 50a-50c, which detect that the operation bases 12a, 12b and 12c have reached, during their descent, the predetermined position at which the clearance between the operation bases 12a, 12b and 12c and the hands 8 becomes the predetermined clearance "c," use the encoders of the Z-axis moving unit 13a, 13b and 13c. Alternatively, however, the detecting units may detect the positions of the operation bases 12a, 12b and 12c by sensors (not shown) or image processing.

As described above, the automated assembly apparatus 1 according to the present embodiment has the control unit. The control unit raises the operation bases 12a, 12b and 12c in advance by the Z-axis moving unit 13a, 13b and 13c of the operation bases 12a, 12b and 12c to the positions, at which there will be no interference with the hands 8, before the assembly robot 2 reaches (moves to) a position above the operation bases 12a, 12b and 12c. Using the control unit reduces the influences on the operation time of a process following the operation for avoiding the interference owing to the difference in height among the plurality of hands 8 having different heights and also the operation for avoiding the interference owing to the difference in height among the plurality of operation bases 12a, 12b and 12c. As a result, it is possible to reduce the operation time of the operation bases 12a, 12b and 12c after the assembly robot 2 moves to above the operation bases 12a, 12b and 12c, thus permitting shorter time required for the assembly operation.

Further, the present invention includes the assembly robot 2 having the XY-axis moving unit 7, which has the plurality of hands 8 of different heights and which is movable in the horizontal direction. The present invention further provides the automated assembly method for automatically assembling components by using the plurality of operation base units 4, 5 and 6, which have the operation bases 12a, 12b and 12c and the Z-axis moving unit 13a, 13b and 13c capable of moving the operation bases 12a, 12b and 12c in the vertical direction. The automated assembly method includes raising in advance the operation bases 12a, 12b and 12c by the Z-axis moving unit 13a, 13b and 13c to the positions, at which they will not interfere with the hands 8, and then moving the assembly robot 2 to above the operation bases 12a, 12b and 12c.

Further, the detecting units 50a-50c are provided to detect that the operation bases 12a, 12b and 12c have reached the predetermined position before these operation bases complete the descending operation. The automated assembly method includes the detection by the detecting unit that the operation bases 12a, 12b and 12c have reached the predetermined positions at which the clearance between the assembly robot 2 and the operation bases 12a, 12b and 12c becomes the predetermined clearance "c." The control is performed by the control unit such that the assembly robot 2 is moved to above the operation bases 12a, 12b and 12c at the instant the respective detecting unit 50a, 50b or 50c detects the clearance "c." This control shortens the standby time of the assembly robot 2, thus making it possible to reduce the time required for the assembly operation.

Thus, the size of the foregoing predetermined clearance "c" is the same in every case. However, the clearance "c" may be set to different dimensions according to the relationship between each operation base and each hand used in an automated assembly apparatus.

The automated assembly apparatus and the automated assembly method according to the embodiment of the present invention described above may be modified as described below. Although the hands 8 for the assembling operation are comprised of two hands, namely, the transfer hand 9 and the assembly hand 10, the hands 8 may alternatively include an additional hand adapted to perform another operation. The number of the hands 8 is optional, and two or more hands may be provided.

Further, regarding the operation base units, the three operation base units, namely, the first, the second and the third operation base units, have been provided in the embodiment described above. However, the number of the operation base units is optional, as with the hands, and the present invention can be applied to a case where three or more operation base units are provided. For example, four operation base units, including the positioning unit 19 for positioning illustrated in FIG. 1, may be used.

The present invention provides the advantages described below.

Before an assembly robot reaches the positions above operation bases, the operation bases are raised in advance by Z-axis moving unit of the operation bases to the positions where the operation bases do not interfere with the hands. This arrangement reduces the influences on the operation time of a process following the operation for avoiding the interference owing to the height difference among a plurality of hands having different heights and also the operation for avoiding the interference owing to the differences in height among the plurality of operation bases. Hence, it is possible to reduce the operation time of the operation bases after the assembly robot moves to above the operation bases, thus permitting shorter time required for the assembly operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-070770, filed Mar. 31, 2015, which is hereby incorporated by reference herein in its entirety.

What is claimed is:

1. A method for manufacturing an assembly using an assembly apparatus, the assembly apparatus comprising:
   an assembly robot having a hand and an XY-axis moving unit arranged to move the hand in a horizontal direction; and
   a first operation base unit having a first operation base and a first Z-axis moving unit capable of moving the first operation base in a vertical direction,
   the method comprising:
   raising the first operation base on which a first part is placed in the vertical direction by the first Z-axis moving unit to grip the first part by the hand; and
   lowering the first operation base by the first Z-axis moving unit to a position in which the hand does not interfere with the first operation base after the gripping the first part by the hand.

2. The method according to claim 1, wherein the assembly apparatus further comprises a detecting unit configured to detect a clearance between the hand and the first operation base, and
   wherein, in the method, the lowering the first operation base includes lowering the first operation base by the first Z-axis moving unit until the clearance detected by the detecting unit becomes equal to or greater than a predetermined value.

3. The method according to claim 2, wherein the detecting unit is an encoder provided in the first Z-axis moving unit.

4. The method according to claim 2, wherein the detecting unit detects the clearance by a sensor or by image processing.

5. The method according to claim 1, further comprising moving the hand gripping the first part in the horizontal direction after the lowering the first operation base by the first Z-axis moving unit to the position in which the hand does not interfere with the first operation base.

6. The method according to claim 1, wherein the assembly apparatus further comprises a second operation base unit having a second operation base and a second Z-axis moving unit capable of moving the second operation base in the vertical direction, the second operation base capable of moving in the vertical direction independently of the first operation base, and the method further comprises:
moving the hand gripping the first part in horizontal direction after the lowering the first operation base to the position in which the hand does not interfere with the first operation base; and
raising the second operation base by the second Z-axis moving unit to a position in which the hand does not interfere with the second operation base before the hand reaches above the second operation base.

7. The method according to claim 6, wherein the assembly apparatus further comprises a detecting unit configured to detect a clearance between the hand and the second operation base, and wherein, in the method, the raising the second operation base includes raising the second operation base by the second Z-axis moving unit until the clearance detected by the detecting unit becomes equal to or less than a predetermined value.

8. The method according to claim 7, wherein the assembly apparatus further comprises another detecting unit configured to detect a clearance between the hand and the first operation base, wherein, in the method, the lowering the first operation base includes lowering the first operation base by the first Z-axis moving unit until the detected clearance between the hand and the first operation base becomes equal to or greater than a predetermined value, and wherein the predetermined value for the clearance between the hand and the first operation base and the predetermined value for the clearance between the hand and the second operation base are different from each other.

9. The method according to claim 7, wherein the assembly apparatus further comprises another detecting unit configured to detect a clearance between the hand and the first operation base, wherein, in the method, the lowering the first operation base includes lowering the first operation base by the first Z-axis moving unit until the detected clearance between the hand and the first operation base becomes equal to or greater than a predetermined value, and wherein the predetermined value for the clearance between the hand and the first operation base and the predetermined value for the clearance between the hand and the second operation base are equal to each other.

10. The method according to claim 6, further comprising, after a second part is held by the second operation base and the hand reaches above the second operation base, raising the second operation base by the second Z-axis moving unit to assemble the first part and the second part.

11. The method according to claim 10, further comprising lowering the second operation base by the second Z-axis moving unit at a position in which the hand does not interfere with the second operation base after the first part and the second part are assembled.

12. The method according to claim 10, wherein the assembly apparatus further comprises a detecting unit configured to detect a clearance between the hand and the second operation base, and wherein, in the method, the lowering the second operation base includes lowering the second operation base by the second Z-axis moving unit until the clearance detected by the detecting unit becomes equal to or greater than a predetermined value.

13. The method according to claim 1,
wherein the assembly robot has a plurality of hands of different heights, and
wherein the position is a position in which the first operation base does not interfere with a hand having a lowermost height among the plurality of hands.

* * * * *